United States Patent
Wang

(10) Patent No.: US 10,542,258 B2
(45) Date of Patent: Jan. 21, 2020

(54) TILE COPYING FOR VIDEO COMPRESSION

(71) Applicant: GOOGLE LLC, Mountain View, CA (US)

(72) Inventor: Yunqing Wang, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 738 days.

(21) Appl. No.: 15/005,545

(22) Filed: Jan. 25, 2016

(65) Prior Publication Data
US 2017/0214920 A1    Jul. 27, 2017

(51) Int. Cl.
| | |
|---|---|
| *H04N 19/129* | (2014.01) |
| *H04N 19/119* | (2014.01) |
| *H04N 19/167* | (2014.01) |
| *H04N 19/176* | (2014.01) |
| *H04N 19/44* | (2014.01) |
| *H04N 19/46* | (2014.01) |

(52) U.S. Cl.
CPC ......... *H04N 19/129* (2014.11); *H04N 19/119* (2014.11); *H04N 19/167* (2014.11); *H04N 19/176* (2014.11); *H04N 19/44* (2014.11); *H04N 19/46* (2014.11)

(58) Field of Classification Search
CPC ...... H04N 19/129; H04N 19/44; H04N 19/46; H04N 19/176; H04N 19/119; H04N 19/167
USPC .................................................. 375/240.24
See application file for complete search history.

(56) References Cited

U.S. PATENT DOCUMENTS

| | | | |
|---|---|---|---|
| 3,825,832 A | 7/1974 | Frei et al. | |
| 4,719,642 A | 1/1988 | Lucas | |
| 4,729,127 A | 3/1988 | Chan et al. | |
| 4,736,446 A | 4/1988 | Reynolds et al. | |
| 4,797,729 A | 1/1989 | Tsai | |

(Continued)

FOREIGN PATENT DOCUMENTS

| | | |
|---|---|---|
| JP | 3510433 B2 | 3/2004 |
| JP | 2007166625 A | 6/2007 |

(Continued)

OTHER PUBLICATIONS

Armando J. Pinho; Encoding of Image Partitions, Using a Standard Technique for Lossless Image Compression; Dep. Electronica e Telecomunicacoes/ INESC Universidade de Aveiro, Portugal.

(Continued)

*Primary Examiner* — James M Anderson, II
(74) *Attorney, Agent, or Firm* — Young Basile Hanlon & MacFarlane, P.C.

(57) ABSTRACT

Tile copying may include decoding a current frame from an encoded video bitstream by decoding, from the encoded video bitstream, tile information for a current tile of the current frame. Decoding the tile information for the current tile of the current frame includes decoding a reference tile offset, and the tile information for the current tile omits encoded tile content information corresponding to the current tile. From the encoded video bitstream, encoded tile content information corresponding to the reference tile is identified based on the reference tile offset, a decoded tile corresponding to the current tile is generated by decoding the encoded tile content information corresponding to the reference tile as the current tile, and the decoded tile is output or stored.

19 Claims, 14 Drawing Sheets

(56) References Cited

U.S. PATENT DOCUMENTS

| | | |
|---|---|---|
| 4,868,764 A | 9/1989 | Richards |
| 4,891,748 A | 1/1990 | Mann |
| 5,068,724 A | 11/1991 | Krause et al. |
| 5,083,214 A | 1/1992 | Knowles |
| 5,091,782 A | 2/1992 | Krause et al. |
| 5,136,371 A | 8/1992 | Savatier et al. |
| 5,136,376 A | 8/1992 | Yagasaki et al. |
| 5,164,819 A | 11/1992 | Music |
| 5,225,832 A | 7/1993 | Wang et al. |
| 5,270,812 A | 12/1993 | Richards |
| 5,274,442 A | 12/1993 | Murakami et al. |
| 5,313,306 A | 5/1994 | Kuban et al. |
| 5,341,440 A | 8/1994 | Earl et al. |
| 5,381,145 A | 1/1995 | Allen et al. |
| 5,432,870 A | 7/1995 | Schwartz |
| 5,452,006 A | 9/1995 | Auld |
| 5,561,477 A | 10/1996 | Polit |
| 5,576,765 A | 11/1996 | Cheney et al. |
| 5,576,767 A | 11/1996 | Lee et al. |
| 5,589,945 A | 12/1996 | Abecassis |
| 5,604,539 A | 2/1997 | Ogasawara et al. |
| 5,646,690 A | 7/1997 | Yoon |
| 5,659,539 A | 8/1997 | Porter et al. |
| 5,696,869 A | 12/1997 | Abecassis |
| 5,734,744 A | 3/1998 | Wittenstein et al. |
| 5,737,020 A | 4/1998 | Hall et al. |
| 5,748,247 A | 5/1998 | Hu |
| 5,774,593 A | 6/1998 | Zick et al. |
| 5,793,647 A | 8/1998 | Hageniers et al. |
| 5,794,179 A | 8/1998 | Yamabe |
| 5,818,969 A | 10/1998 | Astle |
| 5,828,370 A | 10/1998 | Moeller et al. |
| 5,835,144 A | 11/1998 | Matsumura et al. |
| 5,883,671 A | 3/1999 | Keng et al. |
| 5,903,264 A | 5/1999 | Moeller et al. |
| 5,929,940 A | 7/1999 | Jeannin |
| 5,930,493 A | 7/1999 | Ottesen et al. |
| 5,963,203 A | 10/1999 | Goldberg et al. |
| 5,999,641 A | 12/1999 | Miller et al. |
| 6,014,706 A | 1/2000 | Cannon et al. |
| 6,041,145 A | 3/2000 | Hayashi et al. |
| 6,061,397 A | 5/2000 | Ogura |
| 6,084,908 A | 7/2000 | Chiang et al. |
| 6,108,383 A | 8/2000 | Miller et al. |
| 6,112,234 A | 8/2000 | Leiper |
| 6,115,501 A | 9/2000 | Chun et al. |
| 6,119,154 A | 9/2000 | Weaver et al. |
| 6,141,381 A | 10/2000 | Sugiyama |
| 6,160,846 A | 12/2000 | Chiang et al. |
| 6,167,164 A | 12/2000 | Lee |
| 6,181,742 B1 | 1/2001 | Rajagopalan et al. |
| 6,181,822 B1 | 1/2001 | Miller et al. |
| 6,185,363 B1 | 2/2001 | Dimitrova et al. |
| 6,188,799 B1 | 2/2001 | Tan et al. |
| 6,240,135 B1 | 5/2001 | Kim |
| 6,292,837 B1 | 9/2001 | Miller et al. |
| 6,327,304 B1 | 12/2001 | Miller et al. |
| 6,366,704 B1 | 4/2002 | Ribas-Corbera et al. |
| 6,370,267 B1 | 4/2002 | Miller et al. |
| 6,400,763 B1 | 6/2002 | Wee |
| 6,496,537 B1 | 12/2002 | Kranawetter et al. |
| 6,522,784 B1 | 2/2003 | Zlotnick |
| 6,529,638 B1 | 3/2003 | Westerman |
| 6,560,366 B1 | 5/2003 | Wilkins |
| 6,594,315 B1 | 7/2003 | Schultz et al. |
| 6,687,303 B1 | 2/2004 | Ishihara |
| 6,697,061 B1 | 2/2004 | Wee et al. |
| 6,707,952 B1 | 3/2004 | Tan et al. |
| 6,765,964 B1 | 7/2004 | Conklin |
| 6,876,703 B2 | 4/2005 | Ismaeil et al. |
| 6,934,419 B2 | 8/2005 | Zlotnick |
| 6,985,526 B2 | 1/2006 | Bottreau et al. |
| 6,987,866 B2 | 1/2006 | Hu |
| 7,003,035 B2 | 2/2006 | Tourapis et al. |
| 7,023,916 B1 | 4/2006 | Pandel et al. |
| 7,027,654 B1 | 4/2006 | Ameres et al. |
| 7,170,937 B2 | 1/2007 | Zhou |
| 7,227,589 B1 | 6/2007 | Yeo et al. |
| 7,236,524 B2 | 6/2007 | Sun et al. |
| 7,330,509 B2 | 2/2008 | Lu et al. |
| 7,499,492 B1 | 3/2009 | Ameres et al. |
| 7,606,310 B1 | 10/2009 | Ameres et al. |
| 7,764,739 B2 | 7/2010 | Yamada et al. |
| 7,813,570 B2 | 10/2010 | Shen et al. |
| 8,175,161 B1 | 5/2012 | Anisimov |
| 8,401,084 B2 | 3/2013 | MacInnis |
| 8,520,734 B1 | 8/2013 | Xu |
| 8,743,979 B2 | 6/2014 | Lee et al. |
| 8,767,817 B1 | 7/2014 | Xu et al. |
| 9,100,509 B1 | 8/2015 | Jia et al. |
| 9,100,657 B1 | 8/2015 | Jia et al. |
| 2002/0012396 A1 | 1/2002 | Pau et al. |
| 2002/0031184 A1 | 3/2002 | Iwata |
| 2002/0039386 A1 | 4/2002 | Han et al. |
| 2002/0168114 A1 | 11/2002 | Valente |
| 2003/0023982 A1 | 1/2003 | Lee et al. |
| 2003/0189982 A1 | 10/2003 | MacInnis |
| 2003/0215018 A1 | 11/2003 | MacInnis et al. |
| 2003/0219072 A1 | 11/2003 | MacInnis et al. |
| 2004/0028142 A1 | 2/2004 | Kim |
| 2004/0066852 A1 | 4/2004 | MacInnis |
| 2004/0096002 A1* | 5/2004 | Zdepski ............... H04N 19/70 375/240.26 |
| 2004/0120400 A1 | 6/2004 | Linzer |
| 2004/0228410 A1 | 11/2004 | Ameres et al. |
| 2004/0240556 A1 | 12/2004 | Winger et al. |
| 2004/0258151 A1 | 12/2004 | Spampinato |
| 2005/0050002 A1 | 3/2005 | Slotznick |
| 2005/0117655 A1 | 6/2005 | Ju |
| 2005/0147165 A1 | 7/2005 | Yoo et al. |
| 2005/0169374 A1 | 8/2005 | Marpe et al. |
| 2005/0210145 A1 | 9/2005 | Kim et al. |
| 2005/0265447 A1 | 12/2005 | Park |
| 2005/0265461 A1 | 12/2005 | Raveendran |
| 2005/0276323 A1 | 12/2005 | Martemyanov et al. |
| 2006/0072674 A1 | 4/2006 | Saha et al. |
| 2006/0098737 A1 | 5/2006 | Sethuraman et al. |
| 2006/0109912 A1 | 5/2006 | Winger et al. |
| 2006/0114985 A1 | 6/2006 | Linzer |
| 2006/0126726 A1 | 6/2006 | Lin et al. |
| 2006/0126740 A1 | 6/2006 | Lin et al. |
| 2006/0150151 A1 | 7/2006 | Dubinsky |
| 2006/0215758 A1 | 9/2006 | Kawashima |
| 2006/0239345 A1 | 10/2006 | Taubman et al. |
| 2006/0256858 A1 | 11/2006 | Chin |
| 2006/0291567 A1 | 12/2006 | Filippini et al. |
| 2007/0025441 A1 | 2/2007 | Ugur et al. |
| 2007/0053443 A1 | 3/2007 | Song |
| 2007/0086528 A1 | 4/2007 | Mauchly et al. |
| 2007/0092006 A1 | 4/2007 | Malayath |
| 2007/0140342 A1 | 6/2007 | Karczewicz et al. |
| 2007/0229704 A1 | 10/2007 | Mohapatra et al. |
| 2007/0286288 A1 | 12/2007 | Smith et al. |
| 2008/0056348 A1 | 3/2008 | Lyashevsky et al. |
| 2008/0152014 A1 | 6/2008 | Schreier et al. |
| 2008/0159407 A1 | 7/2008 | Yang et al. |
| 2008/0198270 A1 | 8/2008 | Hobbs et al. |
| 2008/0198920 A1 | 8/2008 | Yang et al. |
| 2008/0212678 A1 | 9/2008 | Booth et al. |
| 2008/0240254 A1 | 10/2008 | Au et al. |
| 2009/0003447 A1 | 1/2009 | Christoffersen et al. |
| 2009/0080534 A1 | 3/2009 | Sekiguchi et al. |
| 2009/0225845 A1 | 9/2009 | Veremeev et al. |
| 2009/0238277 A1 | 9/2009 | Meehan |
| 2009/0249178 A1 | 10/2009 | Ambrosino et al. |
| 2010/0061455 A1 | 3/2010 | Xu et al. |
| 2010/0177826 A1 | 7/2010 | Bhaumik et al. |
| 2010/0183076 A1 | 7/2010 | Yoon |
| 2010/0189179 A1 | 7/2010 | Gu et al. |
| 2010/0215263 A1 | 8/2010 | Imanaka |
| 2010/0239181 A1 | 9/2010 | Lee et al. |
| 2010/0246665 A1 | 9/2010 | Brederson et al. |
| 2011/0261884 A1 | 10/2011 | Rubinstein et al. |
| 2012/0014451 A1 | 1/2012 | Lee et al. |

(56) References Cited

U.S. PATENT DOCUMENTS

| | | | |
|---|---|---|---|
| 2012/0075346 A1 | 3/2012 | Malladi et al. | |
| 2012/0128069 A1 | 5/2012 | Sato | |
| 2012/0147958 A1 | 6/2012 | Ronca et al. | |
| 2012/0213448 A1 | 8/2012 | Malmborg et al. | |
| 2012/0294376 A1 | 11/2012 | Tanaka et al. | |
| 2012/0307892 A1 | 12/2012 | Xu et al. | |
| 2013/0034150 A1 | 2/2013 | Sadafale | |
| 2013/0083161 A1 | 4/2013 | Hsu et al. | |
| 2013/0259137 A1 | 10/2013 | Kuusela | |
| 2013/0272428 A1* | 10/2013 | Deshpande | H04N 19/119 375/240.25 |
| 2014/0301465 A1* | 10/2014 | Kwon | H04N 19/503 375/240.16 |
| 2015/0043645 A1 | 2/2015 | Ventela | |
| 2015/0264383 A1* | 9/2015 | Cohen | H04N 19/593 375/240.16 |
| 2015/0326888 A1 | 11/2015 | Jia et al. | |
| 2016/0057447 A1* | 2/2016 | Pu | H04N 19/105 375/240.12 |
| 2016/0227244 A1* | 8/2016 | Rosewarne | H04N 19/105 |
| 2016/0353117 A1* | 12/2016 | Seregin | H04N 19/174 |

FOREIGN PATENT DOCUMENTS

| | | | |
|---|---|---|---|
| WO | 2008020470 A1 | 2/2008 | |
| WO | 2008036237 A2 | 3/2008 | |
| WO | 2010063184 A1 | 6/2010 | |
| WO | 2014111547 | 7/2014 | |
| WO | 2014111547 A1 | 7/2014 | |
| WO | 2015102975 A2 | 7/2015 | |

OTHER PUBLICATIONS

B. Vasudev & N. Merhav, "DCT Mode Conversions for Field/Frame Coded MPEG Video", IEEE 2d Workshop on Multimedia Signal Processing 605-610 (Dec. 1998).
Bankoski et al. "Technical Overview of VP8, An Open Source Video Codec for the Web". Dated Jul. 11, 2011.
Bankoski et al. "VP8 Data Format and Decoding Guide" Independent Submission. RFC 6389, Dated Nov. 2011.
Bankoski et al. "VP8 Data Format and Decoding Guide; draft-bankoski-vp8-bitstream-02" Network Working Group. Internet-Draft, May 18, 2011, 288 pp.
Fore Jun. "An Introduction to Digital Video Data Compression in Java", Chapter 12: DPCM video Codec, CreateSpace, Jan. 22, 2011.
Implementor's Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.
International Search Report and Written Opinion Issued in co-pending PCT International Application No. PCT/US2013/034581 dated Jun. 11, 2013.
Li E Q et al., "Implementation of H.264 encoder on general-purpose processors with hyper-threading technology", Proceedings of SPIE, pp. 384-395, vol. 5308, No. 1, Jan. 20, 2004.
Mozilla, "Introduction to Video Coding Part 1: Transform Coding", Video Compression Overview, Mar. 2012, 171 pp.
ON2 Technologies Inc., White Paper TrueMotion VP7 Video Codec, Jan. 10, 2005, 13 pages, Document Version: 1.0, Clifton Park, New York.
ON2 Technologies, Inc., White Paper On2's TrueMotion VP7 Video Codec, Jul. 11, 2008, pp. 7 pages, Document Version:1.0, Clifton Park, New York.
Overview; VP7 Data Format and Decoder. Version 1.5. On2 Technologies, Inc. Dated Mar. 28, 2005.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
Sharp, "Entropy slices for parallel entropy decoding", ITU-T SG16 Meeting, Apr. 22, 2008-Feb. 5, 2008, Geneva.
Sze, "Massively Parallel CABAC", VCEG meeting, Jan. 7, 2009, London and MPEG meeting, Aug. 7, 2009, Geneva.
Chen T, Y.H. NG; Lossless Color Image Compression Technique for Multimedia Applications; IBM Technical Disclosure Bulletin; vol. 37 No. 10, Oct. 1994.
Tasdizen, et al; "A High Performance Reconfigurable Motion Estimation Hardware Architecture", Design, Automation & Test in Europe Conference & Exhibition, Apr. 20, 2009, IEEE, Piscataway, NJ, US pp. 882-885.
Vos, Luc De and Stegherr, Michael; "Parameterizable VLSI Architectures for the Full-Search Block-Matching Algorithm", IEEE Transactions on Circuits and Systems, vol. 36, No. 10, Oct. 1989 NY US pp. 1309-1316.
VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
VP8 Data Format and Decoding Guide. WebM Project. Google On2. Dated: Dec. 1, 2010.
Wiegand et al, "Overview of the H 264/AVC Video Coding Standard," IEEE Transactions on Circuits and Systems for Video Technology, vol. 13, No. 7, pp. 568, 569, Jul. 1, 2003.
Yao Wang, "Motion Estimation for Video coding", EE4414: Motion Estimation basics, 2005.
Youn et al., "Motion Vector Refinement for high-performance Transcoding" IEEE Transactions on Multimedia, vol. 1, No. 1, Mar. 1999.
Tsang et al., "Hash based fast local search for Intra Block Copy (IntraBC) mode in HEVC screen content coding", Signal and Information Processing Association Annual Summit and Conference (APSIPA), 2015 Asia-Pacific, Dec. 16-19, 2015, pp. 396-400.
Kwon et al, "Fast intra block copy (IntraBC) search for HEVC screen content coding", IEEE International Symposium on Circuits and Systems (ISCAS) 2014, Jun. 2014, pp. 9-12.
Pang et al., "Intra Block Copy for HEVC Screen Content Coding", Data Compression Conference (DCC), Apr. 7-9, 2015, p. 465.
Combined Search and Examination Report for corresponding foreign Application No. GB1621799.4, dated May 25, 2017.
Budagavi, "AHG8: Video coding using Intra motion compensation", JCT-VC of ITU-T SG 16 WP 3 and ISO/IEC JTC I/SC 29/WG 11, 13th Meeting: Incheon, Korea, Apr. 18-26, 2013, 3 pgs.
Deshpande et al., "Copy Slice Type", JCT-VC of ITU-T SG16 WP3 and ISO/IEC JTC1/SC29/WG11, 9th Meeting: Geneva, CH, Apr. 27-May 7, 2012, 5 pgs.

\* cited by examiner

TILE COPYING FOR VIDEO COMPRESSION

BACKGROUND

Digital video can be used, for example, for remote business meetings via video conferencing, high definition video entertainment, video advertisements, or sharing of user-generated videos. Due to the large amount of data involved in video data, high performance compression is needed for transmission and storage. Accordingly, it would be advantageous to provide high resolution video transmitted over communications channels having limited bandwidth, such as video coding using tile copying.

SUMMARY

This application relates to encoding and decoding of video stream data for transmission or storage. Disclosed herein are aspects of systems, methods, and apparatuses for encoding and decoding using tile copying.

An aspect is a method for video decoding using tile copying. Video decoding using tile copying may include receiving an encoded bitstream including information representing a current frame of video data, decoding the current frame, and outputting or storing a decoded output video stream. Decoding the current frame may include decoding a current tile from the current frame, which decoding the current tile may include decoding a header for the current tile. Decoding the header may include decoding a tile copy mode indicator. On a condition that the tile copy mode indicator indicates a tile-copy mode other than copy, decoding the current frame may include generating a decoded tile corresponding to the current tile by decoding tile content information from the encoded bitstream subsequent to the header for the current tile. On a condition that the tile copy mode indicator indicates a tile-copy mode of copy, decoding the header may include decoding offset information, wherein the offset information indicates a spatial difference between a location of a current tile in the current frame and a location of a reference tile in the current frame, and decoding the current frame may include locating tile content information representing the reference tile in the encoded bitstream based on the offset information, generating a decoded tile corresponding to the current tile by decoding the tile content information representing the reference tile as the current tile, and including the decoded tile in the decoded output video stream.

Another aspect is a method for video decoding using tile copying. Video decoding using tile copying may include decoding a current frame from an encoded video bitstream. Decoding the current frame may include decoding, from the encoded video bitstream, tile information for a current tile of the current frame, wherein decoding the tile information for the current tile of the current frame includes decoding a reference tile offset, wherein the tile information for the current tile omits encoded tile content information corresponding to the current tile, identifying, from the encoded video bitstream, encoded tile content information corresponding to the reference tile based on the reference tile offset, and generating a decoded tile corresponding to the current tile by decoding the encoded tile content information corresponding to the reference tile as the current tile, and including the decoded tile in a decoded output video stream. Decoding the current frame may include outputting or storing the decoded output video stream.

Another aspect is a method for video encoding using tile copying. Video encoding using tile copying may include encoding a frame from an input video stream by identifying tiles from the frame, generating a first encoded tile by encoding a first tile from the tiles, including the first encoded tile in an output bitstream, generating a second encoded tile by encoding a second tile from the tiles, and determining whether a difference between encoded tile content of the first encoded tile and encoded tile content of the second encoded tile is within a threshold. On a condition that the difference is within the threshold, video encoding using tile copying may include identifying an offset indicating a difference between a spatial location of the first tile in the frame and the second tile in the frame, including the offset in the output bitstream, omitting the encoded tile content of the second encoded tile from the output bitstream, and transmitting or storing the output bitstream.

Variations in these and other aspects will be described in additional detail hereafter.

BRIEF DESCRIPTION OF THE DRAWINGS

The description herein makes reference to the accompanying drawings wherein like reference numerals refer to like parts throughout the several views.

DETAILED DESCRIPTION

Video compression schemes may include breaking each image, or frame, into smaller portions, such as blocks, and generating an output bitstream using techniques to limit the information included for each block in the output. An encoded bitstream can be decoded to re-create the blocks and the source images from the limited information. In some implementations, the information included for each block in the output may be limited by reducing spatial redundancy, reducing temporal redundancy, or a combination thereof. However, the benefits of coding may be limited by the availability of resources, and the loss or corruption of some data may affect the coding of other data. For example, coding techniques such as partitioning may reduce decoding time through parallelism; however, partitions may be dependent such that corruption or loss of one partition may affect the decoding of other partitions.

In some implementations, coding can include encoding and decoding using tiling to improve error resilience and parallelism and reduce resource utilization and latency. Encoding and decoding using tiling may include column-tiling a frame, such that each tile includes tile-width by frame-height blocks, row-tiling the frame, such that each tile includes frame-width by tile-height blocks, or row-and-column-tiling the frame, such that each tile includes tile-width by tile-height blocks. Column-tiling may improve error resilience and parallelism and may utilize fewer resources. Each column-tile may be coded independently of other tiles. Row-tiling may improve error resilience, through independence, and may reduce latency. Row-tiles may be coded independently of other tiles, or may be include dependencies. However, in some implementations, such as large scale tile coding, tile coding may not take advantage of inter-tile redundancies.

In some implementations, tile coding may include tile copying to improve coding efficiency by reducing inter-tile redundancy. Implementations of tile copying may include evaluating candidate encoded tiles, such as previously encoded tiles proximate to a current tile, to determine whether the encoded content of a candidate tile is identical, or within a threshold of similarity, compared to the encoded current tile. A candidate tile that is identical, or within a threshold of similarity, compared to the encoded current tile may be identified as a reference tile, and the current tile may be identified as a copy tile, wherein the encoded content of the current tile is omitted from the output and an identifier of the reference tile is included in the output as the current tile.

Figure 1:
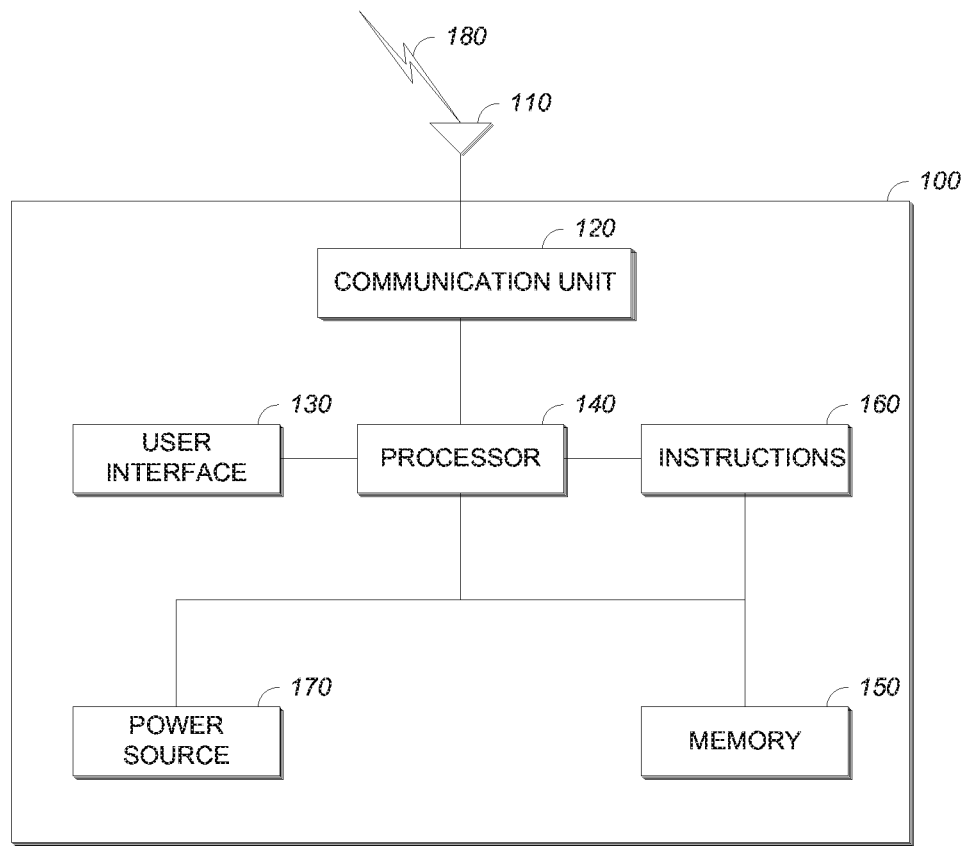
FIG. 1 is a diagram of a computing device in accordance with implementations of this disclosure.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the computing device 100 can be integrated into any number of separate physical units. For example, the UI 130 and the processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the computing device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a special purpose processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, the communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the computing device 100. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
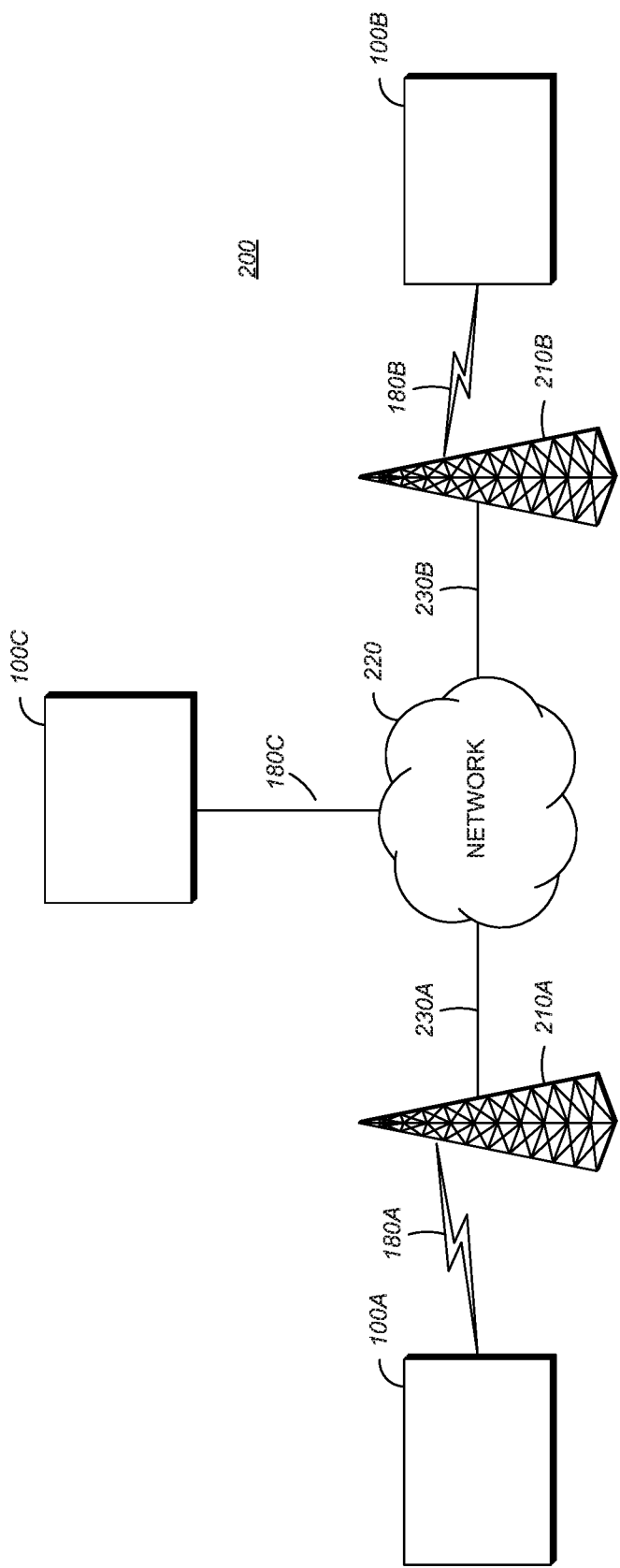
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. For example, as shown the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links. For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation the network 220 can be an ad-hoc network and can omit one or more of the access points 210A/210B. The computing and communications system 200 may include devices, units, or elements not shown in FIG. 2. For example, the computing and communications system 200 may include many more communicating devices, networks, and access points.

Figure 3:
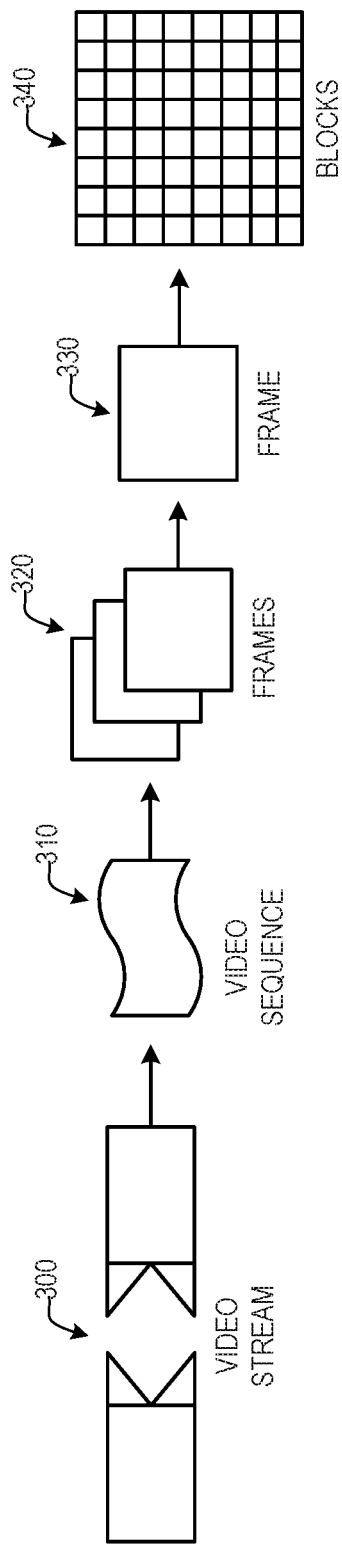
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320. Each frame 330 from the adjacent frames 320 may represent a single image from the video stream. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
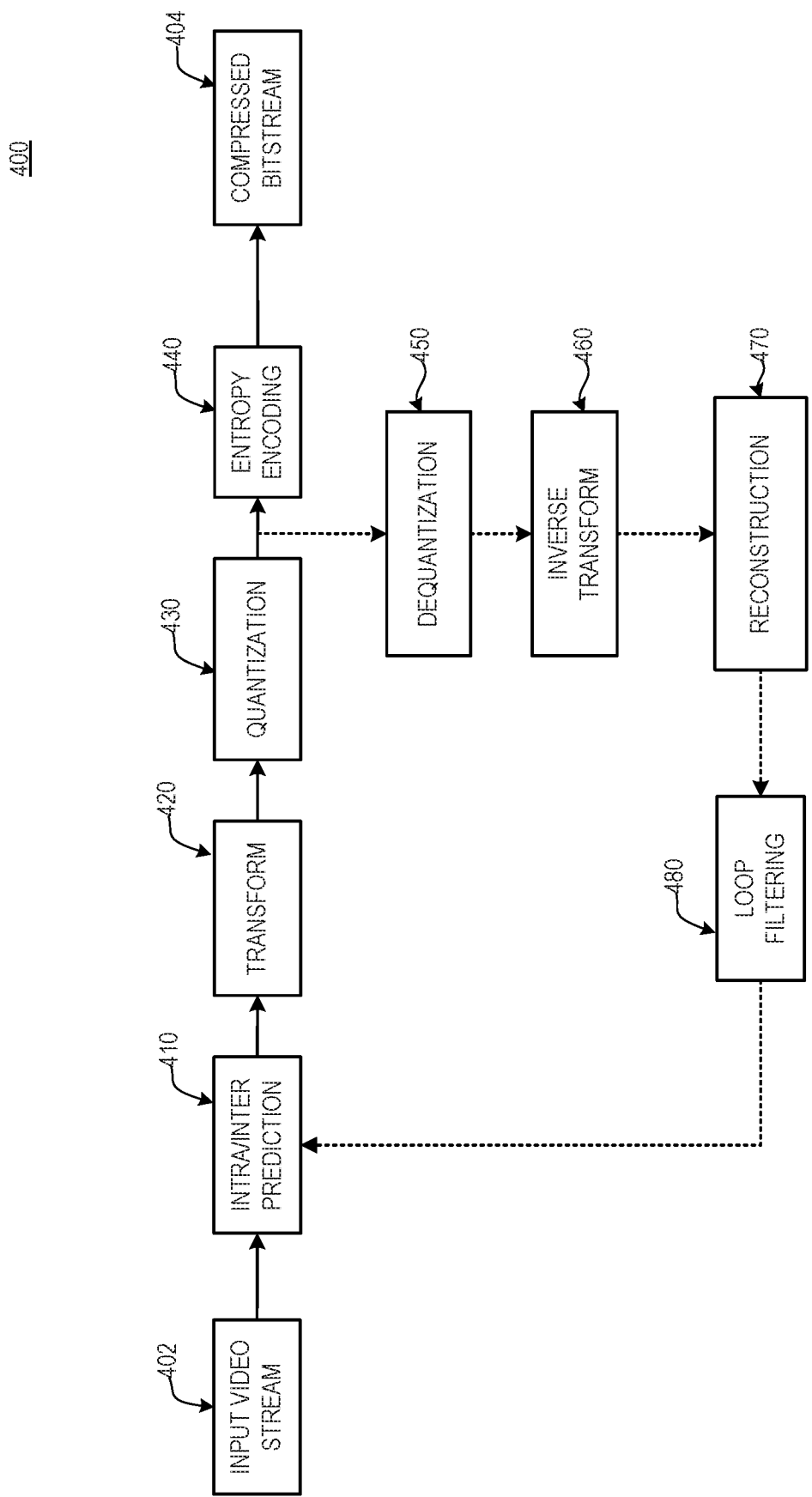
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 140 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3 to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a loop filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference block in the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), and the Singular Value Decomposition Transform (SVD). In an example, the DCT includes transforming a block into the frequency domain. The DCT includes using transform coefficient values based on spatial frequency, with the lowest frequency (i.e., DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
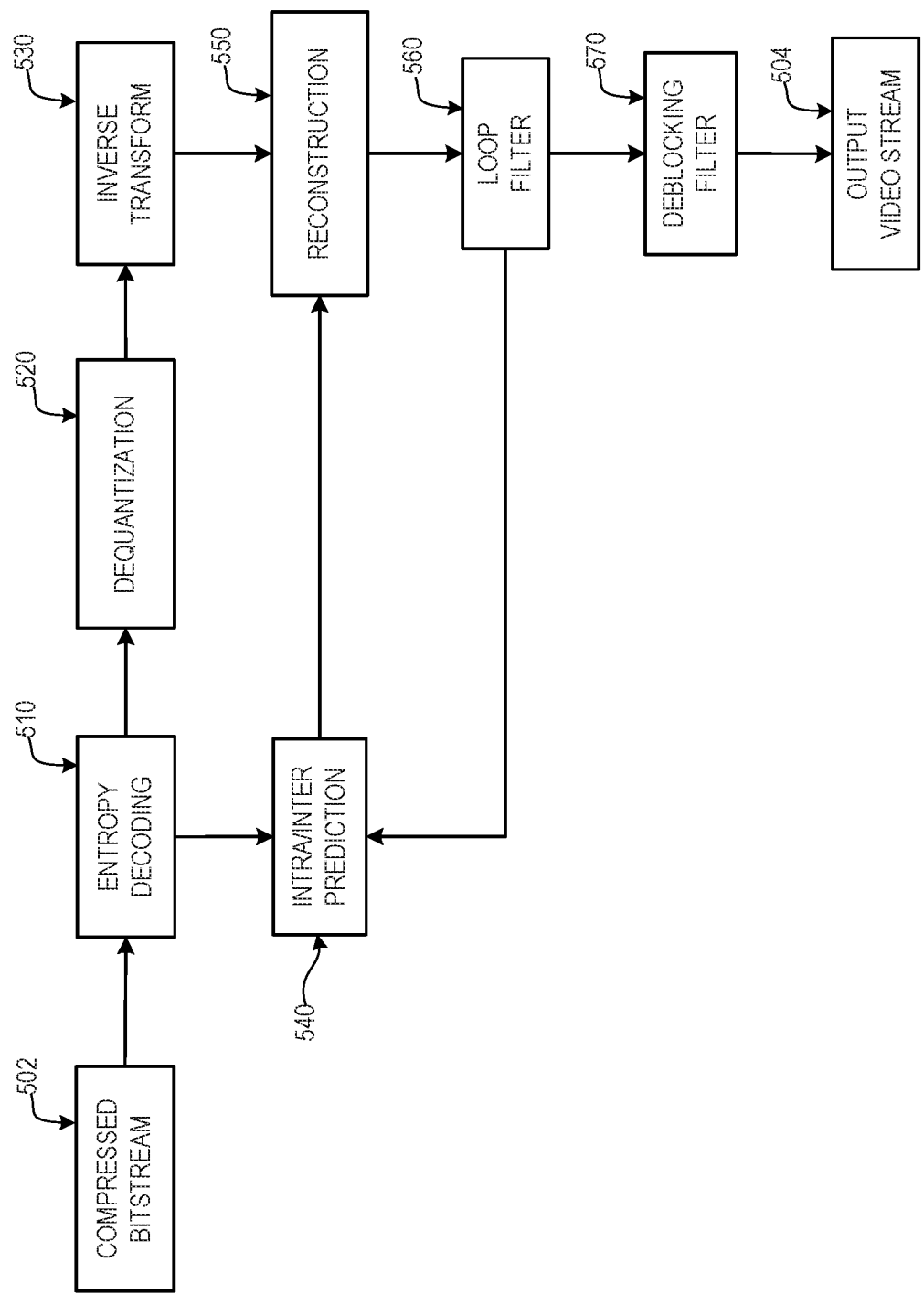
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below, and may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a reconstructed block. The loop filtering unit 480 can be applied to the reconstructed block to reduce distortion, such as blocking artifacts.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 140 shown in FIG. 1, and may cause the device to decode video data as described herein. The decoder 500 can be implemented as specialized hardware included, for example, in the computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a loop filtering unit 560, a deblocking filtering unit 570, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond with the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a reconstructed block. The loop filtering unit 560 can be applied to the reconstructed block to reduce blocking artifacts. The deblocking filtering unit 570 can be applied to the reconstructed block to reduce blocking distortion, and the result may be output as the output video stream 504.

Other variations of the decoder 500 can be used to decode the compressed bitstream 502. For example, the decoder 500 can produce the output video stream 504 without the deblocking filtering unit 570.

Figure 6:
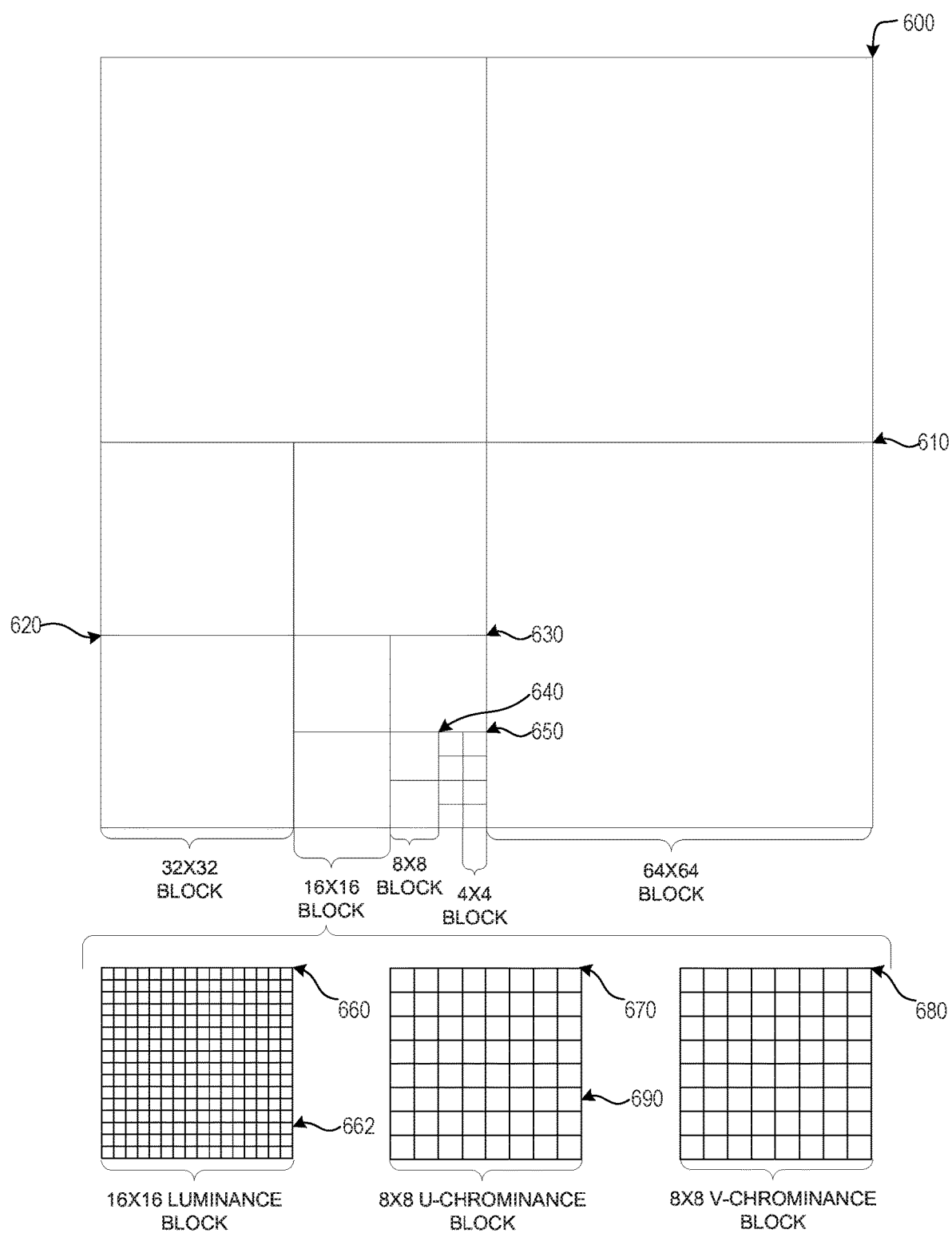
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670/680, such as a U or Cb chrominance block 670, and a V or Cr chrominance block 680. The chrominance blocks 670/680 may include chrominance pixels 690. For example, the luminance block 660 may include 16×16 luminance pixels 662 and each chrominance block 670/680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6 may be coded using quad-tree coding wherein the top left 32×32 block may be coded, then the top right 32×z32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame, and using a relatively small amount of information to represent each corresponding chrominance component for the portion of the frame. For example, a portion of a frame may be represented by a high resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location, and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a block or pixel in a reference frame, or a portion of the reference frame, that corresponds with a current block or pixel of a current frame. For example, a reference frame, or a portion of a reference frame, which may be stored in memory, may be searched for the best block or pixel to use for encoding a current block or pixel of the current frame. For example, the search may identify the block of the reference frame for which the difference in pixel values between the reference block and the current block is minimized, and may be referred to as motion searching. In some implementations, the portion of the reference frame searched may be limited. For example, the portion of the reference frame searched, which may be referred to as the search area, may include a limited number of rows of the reference frame. In an example, identifying the reference block may include calculating a cost function, such as a sum of absolute differences (SAD), between the pixels of the blocks in the search area and the pixels of the current block.

In some implementations, the spatial difference between the location of the reference block in the reference frame and the current block in the current frame may be represented as a motion vector. The difference in pixel values between the reference block and the current block may be referred to as differential data, residual data, or as a residual block. In some implementations, generating motion vectors may be referred to as motion estimation, a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two dimensional data structure such as a matrix as shown, or in a one dimensional data structure, such as a vector array. In an implementation, a representation of the frame, such as a two dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, block based coding efficiency may be improved by partitioning blocks into one or more partitions, which may be rectangular, including square, partitions. In some implementations, video coding using partitioning may include selecting a partitioning scheme from among multiple candidate partitioning schemes. For example, in some implementations, candidate partitioning schemes for a 64×64 coding unit may include rectangular size partitions ranging in sizes from 4×4 to 64×64, such as 4×4, 4×8, 8×4, 8×8, 8×16, 16×8, 16×16, 16×32, 32×16, 32×z32, 32×64, 64×32, or 64×64. In some implementations, video coding using partitioning may include a full partition search, which may include selecting a partitioning scheme by encoding the coding unit using each available candidate partitioning scheme and selecting the best scheme, such as the scheme that produces the least rate-distortion error.

In some implementations, encoding a video frame may include identifying a partitioning scheme for encoding a current block, such as block 610. In some implementations, identifying a partitioning scheme may include determining whether to encode the block as a single partition of maximum coding unit size, which may be 64×64 as shown, or to partition the block into multiple partitions, which may correspond with the sub-blocks, such as the 32×32 blocks 620 the 16×16 blocks 630, or the 8×8 blocks 640, as shown, and may include determining whether to partition into one or more smaller partitions. For example, a 64×64 block may be partitioned into four 32×32 partitions. Three of the four 32×32 partitions may be encoded as 32×32 partitions and the fourth 32×32 partition may be further partitioned into four 16×16 partitions. Three of the four 16×16 partitions may be encoded as 16×16 partitions and the fourth 16×16 partition may be further partitioned into four 8×8 partitions, each of which may be encoded as an 8×8 partition. In some implementations, identifying the partitioning scheme may include using a partitioning decision tree.

In some implementations, video coding for a current block may include identifying an optimal coding mode from multiple candidate coding modes, which may provide flexibility in handling video signals with various statistical properties, and may improve the compression efficiency. For example, a video coder may evaluate each candidate coding mode to identify the optimal coding mode, which may be, for example, the coding mode that minimizes an error metric, such as a rate-distortion cost, for the current block. In some implementations, the complexity of searching the candidate coding modes may be reduced by limiting the set of available candidate coding modes based on similarities between the current block and a corresponding prediction block. In some implementations, the complexity of searching each candidate coding mode may be reduced by performing a directed refinement mode search. For example, metrics may be generated for a limited set of candidate block sizes, such as 16×16, 8×8, and 4×4, the error metric associated with each block size may be in descending order, and additional candidate block sizes, such as 4×8 and 8×4 block sizes, may be evaluated.

Figure 7:
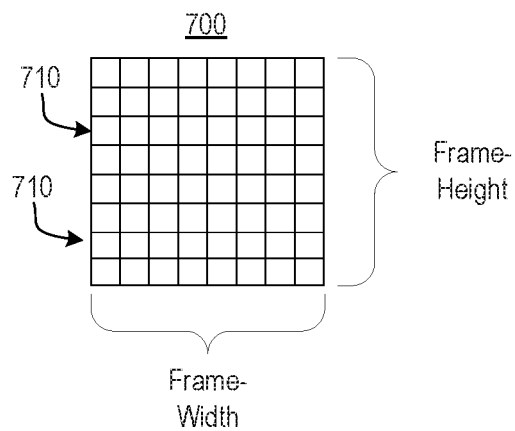
FIG. 7 is a diagram of an example of frame tiling in accordance with implementations of this disclosure.

FIG. 7 is a diagram of an example of frame tiling in accordance with implementations of this disclosure. In some implementations, a frame 700, such as the frame 330 shown in FIG. 3, may include blocks 710. For example, the frame 700 may include a two dimensional 8×8 matrix of blocks 710 as shown, a 16×16 matrix of blocks, a 64×64 matrix of blocks, or any other matrix or configuration of blocks capable of representing an image of a video sequence. In some implementations, the frame 700 may be arranged as a matrix having rows and columns of blocks 710 as shown. The number, or cardinality, of blocks in a row may be referred to as the frame-width. The number, or cardinality, of blocks in a column may be referred to as the frame-height. For example, the frame 700 shown in FIG. 7 has a frame-width of eight, indicating a cardinality of eight horizontally adjacent blocks per frame row, and a frame-height of eight, indicating a cardinality of eight vertically adjacent blocks per frame column.

Although not shown in FIG. 7, the blocks 710 can include pixels. For example, a block can include a 16×16 group of pixels, an 8×8 group of pixels, an 8×16 group of pixels, or any other group of pixels. In some implementations, the blocks 710 may be arranged as a respective matrix having rows and columns of pixels. The number, or cardinality, of pixels in a row may be referred to as the block-width. The number, or cardinality, of pixels in a column may be referred to as the block-height.

Figure 8:
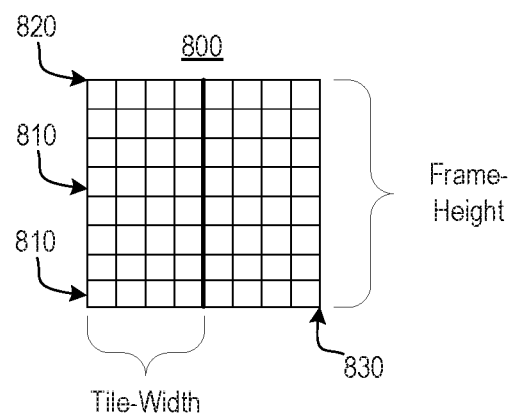
FIG. 8 is a diagram of an example of a column-tiled frame in accordance with implementations of this disclosure.
Figure 9:
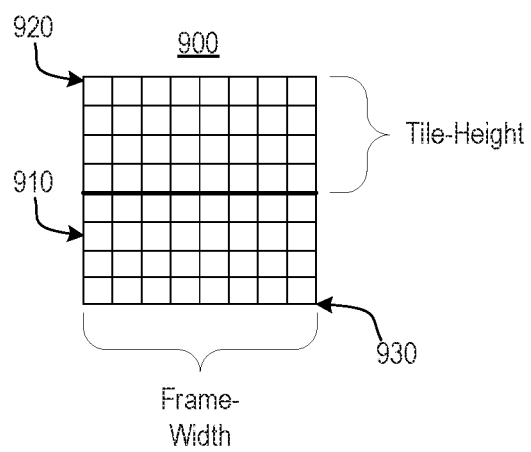
FIG. 9 is a diagram of an example of a row-tiled frame in accordance with implementations of this disclosure.
Figure 10:
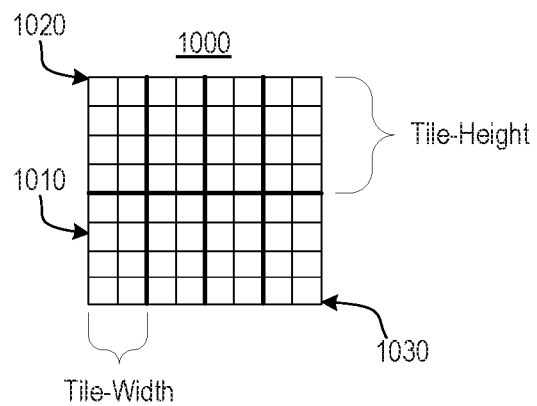
FIG. 10 is a diagram of an example of a row-and-column-tiled frame in accordance with implementations of this disclosure.

In some implementations, tiling may include organizing a frame into sub-sections, or tiles. For example, a frame may be column-tiled, as shown in FIG. 8, row-tiled, as shown in FIG. 9, or may be organized using a combination of column-tiling and row-tiling as shown in FIG. 10.

In some implementations, tiling may improve error resilience for storing or transmitting a video sequence. For example, each tile may be encoded and decoded independently of each other tile, and a lost or corrupt tile, such as a tile that is partially or completely lost or corrupted during transmission over a lossy network connection, such as a UDP network connection, may not effect decoding of other tiles.

In some implementations, tiling may improve parallelism for encoding and decoding a video sequence. For example, each tile may be encoded and decoded independently of each other tile and multiple tiles may be encoded or decoded in parallel, using, for example, multiple processors, multiple encoders, multiple cores, or a combination thereof. Parallel processing may increase encoding or decoding speed.

In some implementations, tiling may reduce hardware utilization. For example, a video frame may be decoded block-by-block, and may use temporary storage buffers of block-height by frame-width to buffer decoded results. The video frame may be 16000 pixels wide, may have a block size of 64×64 pixels, each pixel may utilize one byte of storage, and decoding the frame may utilize 64×16000 bytes, or 1 MB, of temporary memory to store the blocks for reconstruction. A column-tiled frame, which may have a maximum tile-width, may be decoded independently of other tiles, which may include utilizing block-height by tile-width memory to buffer decoded results. For example, the tiles may be 4000 pixels wide, and decoding a tile may utilize 64×4000, or 256 kB of buffer. Utilizing fewer memory buffer resources may reduce hardware costs.

In some implementations, tiling may reduce latency. For example, one or more encoded tiles in a frame may be transmitted or stored concurrently with encoding of other tiles in the frame. In an example, a video stream may be encoded and transmitted for real-time communications via a rate-limited bandwidth transmission medium at 25 fps and 40 ms transfer time per frame. Transmitting one or more encoded tiles concurrently with encoding other tiles in a frame may reduce latency by (n_rows−1)×40 ms/n_rows. For example, for two rows, latency may be reduced by 20 ms, and for four rows, latency may be reduced by 30 ms.

FIG. 8 is a diagram of an example of a column-tiled frame 800 in accordance with implementations of this disclosure. The column-tiled frame 800 may be similar to the portion 600 of the frame shown in FIG. 6, except that the column-tiled frame 800 may include column-tiles 820/830. The number, or cardinality, of blocks 810 in a row of a column-tile may be referred to as the tile-width. The number, or cardinality, of blocks 810 in a column of a column-tile may be the frame-height. For example, the column-tiles 820/830 shown in FIG. 8 may each have a tile-width of four, indicating a cardinality of four horizontally adjacent blocks 810 per tile row, and a frame-height of eight, indicating a cardinality of eight vertically adjacent blocks 810 per tile column.

FIG. 9 is a diagram of an example of a row-tiled frame 900 in accordance with implementations of this disclosure. The row-tiled frame 900 may be similar to the portion 600 of the frame 600 shown in FIG. 6, except that the row-tiled frame 900 may include row-tiles 920/930. The number, or cardinality, of blocks 910 in a column of a row-tile may be referred to as the tile-height. The number, or cardinality, of blocks 910 in a row of a row-tile may be the frame-width. For example, the row-tiles 920/930 shown in FIG. 9 may each have a tile-height of four, indicating a cardinality of four vertically adjacent blocks 910 per tile column, and a frame-width of eight, indicating a cardinality of eight horizontally adjacent blocks 910 per tile row.

FIG. 10 is a diagram of an example of a row-and-column-tiled frame 1000 in accordance with implementations of this disclosure. The row-and-column-tiled frame 1000 may be similar to the portion 600 of the frame 600 shown in FIG. 6, except that the row-and-column-tiled frame 1000 may include row-and-column-tiles 1020/1030. The number, or cardinality, of blocks 1010 in a column of a row-and-column-tile may be referred to as the tile-height. The number, or cardinality, of blocks 1010 in a row of a row-and-column-tile may be referred to as the tile-width. For example, the row-and-column-tiles 1020/1030 shown in FIG. 10 may each have a tile-height of four, indicating a cardinality of four vertically adjacent blocks 1010 per tile column, and a tile-width of two, indicating a cardinality of two horizontally adjacent blocks 1010 per tile row.

Figure 11:
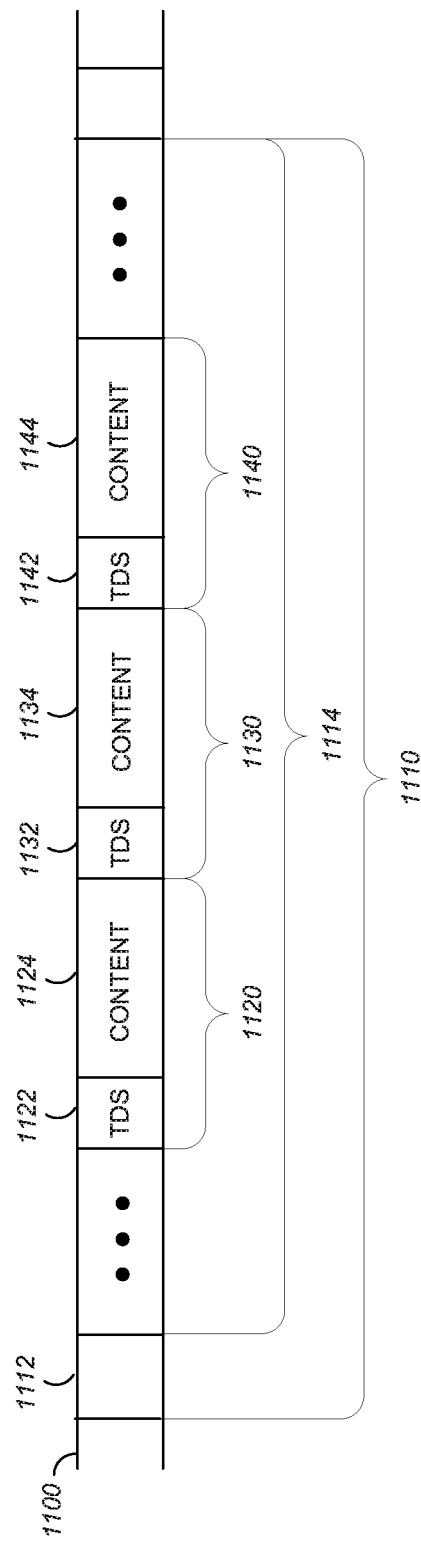
FIG. 11 is a diagram of an example of an output bitstream structure including tile information of an output bitstream structure including tile information in accordance with implementations of this disclosure.

FIG. 11 is a diagram of an example of an output bitstream structure including tile information in accordance with implementations of this disclosure. In some implementations, an output bitstream 1100 may include encoded video data organized in a bitstream structure. For example, as shown, the output bitstream 1100 may include information representing a frame 1110, or a sequence of frames In some implementations, the information representing a frame 1110 may include a frame header 1112, a frame body 1114, or both. A frame body 1114 may include information representing tiles 1120/1130/1140. In some implementations, the information representing a tile 1120/1130/1140 may include a tile header 1122/1132/1142, a tile body 1124/1134/1144, or both. For example, the tile information shown on the left for the tile 1120 includes a tile header 1122 and a tile body 1124; the tile information shown in the center for the tile 1130 includes a tile header 1132 and a tile body 1134; and the tile information shown on the right for the tile 1140 includes a tile header 1142 and a tile body 1144.

In some implementations, a tile body 1124/1134/1144 may include video content, which may be compressed video content, corresponding to the tile. In some implementations, a tile header 1122/1132/1134 may include respective tile control parameters, such as a tile content data size (TDS). A tile content data size may indicate a size, such as a number of bits, of the encoded tile content in the bitstream, such as a size of the corresponding tile body. The size of an encoded tile may be the sum of the size of the tile header and the tile content data size.

In some implementations, a decoder may identify a location of a tile in a bitstream based, at least in part, on information indicated in the tile header. For example, a decoder may decode the bitstream starting from a current location in the bitstream, which may correspond with the beginning of a tile header, such as the tile header 1122 for the leftmost tile 1120 shown in FIG. 11. The tile header 1122 may indicate a tile content data size of the corresponding tile body 1124. The decoder may determine the bitstream location of the beginning of the next, or subsequent, tile 1130 as a sum of the bitstream location of the beginning of the current tile, the size of the tile header, and the tile content data size.

For example, a tile header 1122/1132/1142 may have a defined size HS, such as eight bits (HS=8), the tile header may begin at an identified location, or position, N in the bitstream, such as position or bitstream location 100 (N=100). The tile header may be included in the bitstream at the eight bits from bitstream location N, such as bitstream location 100, to bitstream location N+7 (N+HS−1), such as bitstream location 107. The tile header may indicate a tile content data size of the tile body, such as ten bits (TDS=10). The tile body may be included in the bitstream at the ten bits from the bitstream location subsequent to the tile header, N+HS, such as bitstream location 108, to bitstream location N+HS+TDS−1, such as bitstream location 117, and a subsequent tile may be included in the bitstream beginning at the subsequent location N+HS+TDS, such as bitstream location 118.

In some implementations, the output as shown in FIG. 11 may include encoded content for a tile that is redundant with respect to the encoded content of a tile previously included in the output bitstream. In an example, the encoded content for a first tile, such as the tile 1120 shown on the left in FIG. 11, may be included in the output bitstream in the portion of the output bitstream corresponding to the tile body for the first tile, such as the tile body 1124. The encoded content for a subsequent tile in scan order and spatially adjacent to the first tile in the frame, may be identical to the encoded content included in the output bitstream for the first tile, and may be included in the output bitstream in the portion of the output bitstream corresponding to the tile body for the second tile, such as the tile body 1134.

Figure 12:
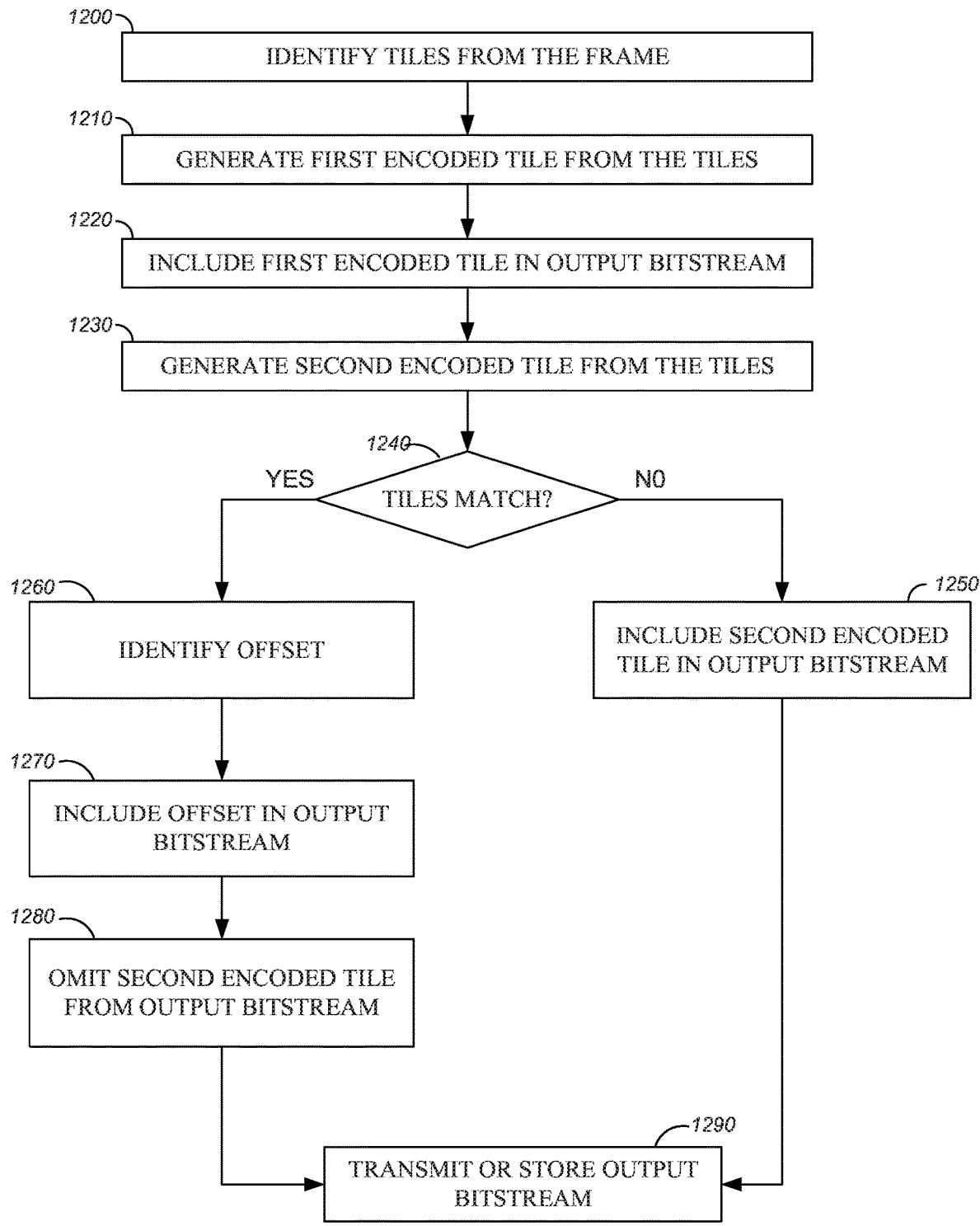
FIG. 12 is a block diagram of encoding using tile copying in accordance with implementations of this disclosure.

FIG. 12 is a block diagram of encoding using tile copying in accordance with implementations of this disclosure. In some implementations, encoding using tiling copying may be implemented in an encoder, such as the encoder 400 shown in FIG. 4. In some implementations, encoding using tiling copying may include identifying tiles at 1200, encoding a first tile at 1210, outputting the first encoded tile at 1220, generating a second encoded tile at 1230, determining whether the second encoded tile matches a previously encoded tile at 1240, outputting the second encoded tile at 1250, identifying a reference tile offset at 1260, outputting the reference tile offset at 1270, omitting the second encoded tile from the output at 1280, transmitting or storing the output at 1290, or any combination thereof.

Although not shown separately in FIG. 12, in some implementations, a current frame of an input video sequence may be identified at 1200. Identifying a current frame, such as the frame 330 shown in FIG. 3, for encoding the input video sequence may include identifying an input video stream, such as the video stream 300 shown in FIG. 3.

In some implementations, tiles may be identified at 1200. For example, one or more tiles may be identified from a current frame of the input video sequence as shown in FIGS. 7-10. In some implementations, a small number of tiles, such as four or eight tiles may be identified for the frame. In some implementations, a large number of tiles, such as 1024×1024 tiles may be identified for the frame. Although FIGS. 7-10 show examples using a small number of row-tiled, column-tiled, or row-and-column-tiled rectangular tiles, video coding using tile copying may be implemented using other numbers, arrangements, sizes, or shapes of tiles. For example, video coding using tile copying may be implemented using square tiles, such as tiles including 64×64 pixels, which may be in one or more blocks, or arbitrarily shaped tiles.

In some implementations, tiles may be encoded at 1210. For example, one or more tiles from the tiles identified from the current frame at 1200 may be encoded to generate entropy coded tiles. In some implementations, the tiles may be encoded in a scan order, such as raster scan order. For simplicity and clarity, tile copying is described herein with reference to coding tiles in raster scan order; however, tile coding may be implemented using any scan order.

In some implementations, encoding tiles at 1210 may include, for example, prediction coding by a prediction coding unit, such as the intra/inter prediction unit 410 shown in FIG. 4, transform coding by a transform coding unit, such as the transform unit 420 shown in FIG. 4, quantization by a quantization unit, such as the quantization unit 430 shown in FIG. 4, entropy coding by an entropy coding unit, such as the entropy coding unit 440 shown in FIG. 4, or a combination thereof.

In some implementations, prediction coding a tile may include generating motion information, such as one or more motion vectors, representing motion between the tile, or a portion thereof, such as a block, in the current frame, and a corresponding portion of a reference frame, and generating a residual as a difference between the portion of the current frame corresponding to the tile, or the portion thereof, and the corresponding portion of the reference frame. In some implementations, the motion information and the residual information, or transformed and quantized information corresponding to the residual information, may be entropy coded to generate entropy coded content for the tile.

In some implementations, encoded tiles may be output at 1220. In some implementations, outputting encoded tiles at 1220 may include determining a tile content data size, which may be a sum of a size, which may be a number of bits, of the entropy coded motion information and the entropy coded residual information. In some implementations, the tile content data size for a tile may include a sum of a size of entropy coded motion information, entropy coded residual information, and corresponding coding parameters or information, such as information included in block headers for blocks included in the tile.

In some implementations, outputting encoded tiles at 1220 may include generating a tile header, determining a beginning location in the output bitstream for the tile, and including the bits representing the tile header in the output bitstream beginning at the beginning location. In some implementations, including the bits representing the tile header in the output bitstream may include including the tile content data size in the header portion of the output bitstream, as shown at 1122/1132/1142 in FIG. 11. For example, the tile header 1122 for the tile 1120 shown at the left in FIG. 11 may include tile content data size information indicating a size of the corresponding tile body 1124.

In some implementations, outputting encoded tiles at 1220 may include including the tile content, which may include the entropy coded motion information and the entropy coded residual information, in the tile body portion of the tile information in the output bitstream. The tile body 1124 for the tile 1120 shown at the left in FIG. 11 may include the encoded tile content for the tile.

In some implementations, a current, or second, encoded tile may be generated at 1230. In some implementations, generating a current encoded tile at 1230 may include identifying a current tile in the frame, and encoding the current tile, which may be similar to the tile coding shown at 1210, to generate a current entropy coded tile. In some implementations, the current tile may be spatially proximate one or more previously coded tiles of the frame, such as the tiles encoded at 1210 and output at 1220, in scan order. For example, the scan order may be raster-scan order, and the current tile may be below a previously coded tile, to the right of a previously coded tile, or both. In some implementations, generating the current encoded tile at 1230 may include determining a tile content data size for the current encoded tile, which may be based on the entropy coded content of the current encoded tile.

In some implementations, whether the current encoded tile matches a previously encoded tile may be determined at 1240. In some implementations, determining whether the current encoded tile generated at 1230 matches a previously encoded tile, such as a tile encoded at 1210, may include identifying candidate tiles, such as previously coded tiles spatially proximate, such as immediately adjacent, in scan order, to the location in the current frame represented by the current encoded tile. For example, the scan order may be raster-scan order, and previously coded tiles immediately above, above-left, above-right, and left of the current tile may be identified as candidate tiles.

In some implementations, determining whether the current encoded tile matches a previously encoded tile at 1240 may include determining a difference between the entropy coded content for the current encoded tile and the entropy coded content for respective candidate tiles. In some implementations, the difference between the entropy coded content for the current encoded tile and the entropy coded content for a candidate tile may be within a threshold, and the candidate tile may be identified as a reference tile for the current encoded tile. In some implementations, the threshold may be zero. For example, the entropy coded content of a candidate tile identified as a reference tile for the current encoded tile may be identical to the entropy coded content of the current encoded tile.

In some implementations, determining whether the current encoded tile matches a previously encoded tile at 1240 may include evaluating each candidate tile to determine whether the respective tile may be identified as a reference tile. In some implementations, the candidate tiles may be evaluated until each candidate tile is evaluated, or until a candidate tile is identified as a reference tile. In some implementations, the candidate tiles may be evaluated in an order, which may be a defined order, such as left, above, above-left, above-right, or a determined order, such as an order determined based on motion information, since common motion vectors between two tiles likely means that tile content is similar. For example, motion information for the current tile, the candidate tiles, or both, may indicate motion similarity decreasing from above-right toward left, and a corresponding candidate tiles evaluation order may be determined, such as above-right, above, above-left, left.

In some implementations, the current encoded tile may be output at 1250. For example, determining whether the current encoded tile matches a previously encoded tile at 1240 may not identify a reference tile, which may indicate a difference between the current encoded tile and each respective candidate tile, and the current encoded tile may be included in the output bitstream, which may be similar to including the first encoded tile in the output bitstream at 1220. For example, including the current encoded tile in the output bitstream at 1250 may include including the tile content data size in a portion of the output bitstream corresponding to a tile header for the current tile and including the content, which may include the entropy coded content, for the current encoded tile in a portion of the output bitstream corresponding to the tile body for the current tile.

Although not shown separately in FIG. 12, in some implementations, outputting the current encoded tile content at 1250 may include generating a tile-copy mode indicator, such as a bit, or flag, indicating that the encoded content for the current encoded block is included in the output bitstream, including the tile-copy mode indicator and the tile content data size in a header for the current tile, and including the content for the current tile in the output bitstream. For example, a tile-copy mode indicator value of zero may indicate that the encoded content for the current encoded block is included in the output bitstream.

In some implementations, a reference tile offset may be identified at 1260. For example, a reference tile may be identified at 1240 and a reference tile offset may be identified at 1260. In some implementations, identifying a reference tile offset may include identifying a spatial difference between a location, in the current frame, of the tile encoded as the current encoded tile, and a location, in the current frame, of the tile encoded as the reference tile. In some implementations, the reference tile offset may be expressed as a row offset and a column offset, such as the absolute row and column distance between the current tile and the reference tile. For example, the current encoded tile generated at 1230 may correspond with the third column and fourth row of the current frame, the reference tile identified at 1240 may correspond with the second column and third row of the current frame, and the reference tile offset may be expressed as (1,1).

In some implementations, the reference tile offset may be output at 1270. Although not shown separately in FIG. 12, outputting the reference tile offset at 1270 may include generating a tile header for the current tile, including the reference tile offset in the tile header for the current tile, and including the tile header for the current tile in the output bitstream. Although not shown separately in FIG. 12, in some implementations, outputting the reference tile offset at 1270 may include generating a tile-copy mode indicator, such as a bit, or flag, indicating that the tile is a copy tile, which may indicate that the encoded content for the current encoded block generated at 1230 is omitted from the output bitstream, including the tile-copy mode indicator in a header for the current tile, and including the header for the current tile in the output bitstream. For example, a tile-copy mode indicator value of one may indicate that the tile is a copy tile.

In some implementations, the encoded content generated at 1230 for the current encoded tile may be omitted from the output at 1280. For example, in response to the current tile being designated as a copy tile, the output bitstream may include a tile header for the current tile and may omit a tile body for the current tile.

In some implementations, a candidate tile may be a copy tile, and determining whether the current tile and the candidate tile are a match at 1240 may include identifying the reference tile for the candidate tile based on the offset information in the header of the candidate tile, and then comparing the encoded content of the reference tile to the encoded content of the current tile. If a tile match is determined, then the current tile is designated as a copy tile, and the offset information associated with the reference tile is identified for the current tile at 1260, and included in the header for the current tile at 1270. The result is two copy tiles having a common reference tile.

In some implementations, the output may be transmitted or stored at 1290. For example, the output may be transmitted to another device, such as the decoder 500 shown in FIG. 5, via a wired or wireless communication system, such as the wireless network shown in FIG. 2.

Figure 13:
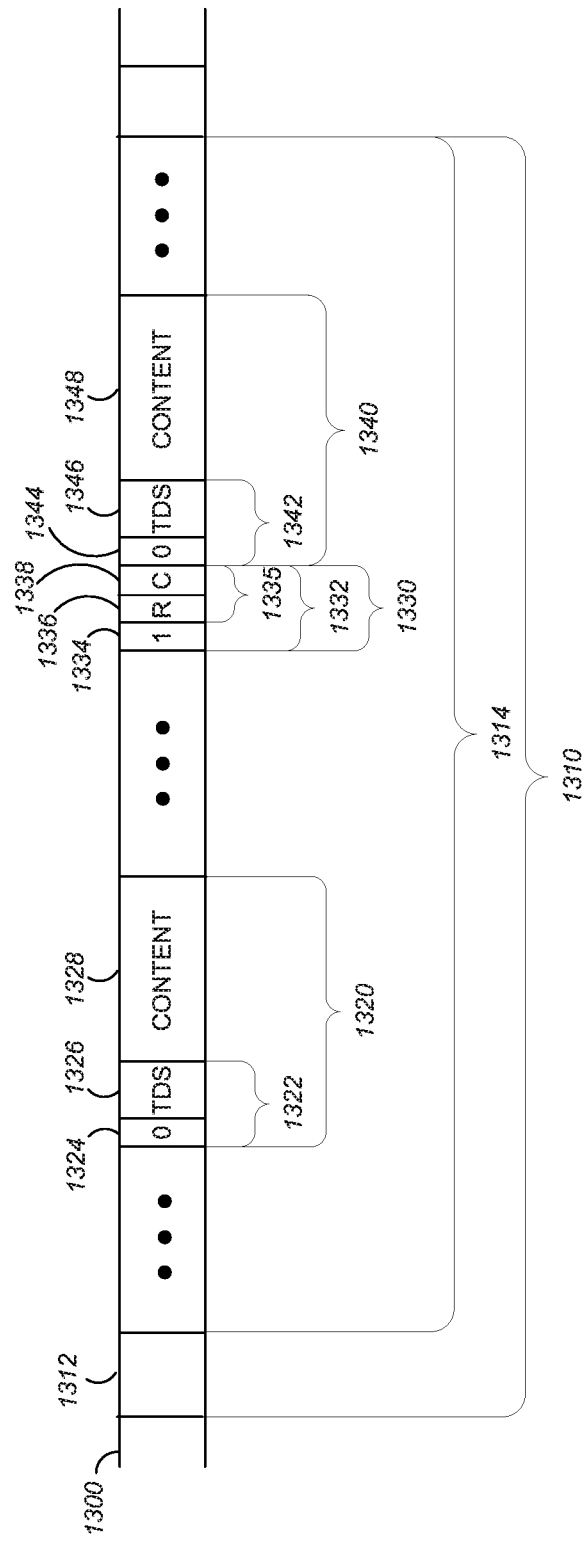
FIG. 13 is a block diagram of an example of an output bitstream structure including tile information encoded using tile copying in accordance with implementations of this disclosure.

FIG. 13 is a block diagram of an example of an output bitstream structure including tile information encoded using tile copying in accordance with implementations of this disclosure. In some implementations, an output bitstream 1300 may include encoded video data organized in a bitstream structure. For example, as shown, the output bitstream 1300 may include information representing a frame 1310, or a sequence of frames.

In some implementations, the information representing a frame 1310 may include a frame header 1312, a frame body 1314, or both. A frame body 1314 may include information representing tiles 1320/1330/1340. In some implementations, the information representing a tile 1320/1330/1340 may include a tile header 1322/1332/1342, a tile body 1328/1348, or both. For example, the tile information shown on the left for the tile 1320 includes a tile header 1322 and a tile body 1328; the tile information shown in the center for the tile 1330 includes a tile header 1332; and the tile information shown on the right for the tile 1340 includes a tile header 1342 and a tile body 1348.

In some implementations, the tile information for a tile, such as the tile 1320 on the left or the tile 1340 on the right, may be similar to the tile information for a tile as shown in FIG. 11, except that the header 1322/1342 may include a tile-copy mode indicator 1324/1344, which may be included in the bitstream before the tile content data size information 1326/1346, and which may be included as the first bit of the tile header, as shown. The tile-copy mode indicator 1324/1344 for the tile 1320 on the left and the tile 1340 on the right, respectively, is shown as having a value of zero indicating that the encoded content for the respective tiles is included in the respective tile body portion 1328/1348 for the respective tile 1320/1340 in the encoded, output bitstream 1300, as shown.

In some implementations, the tile information for a copy tile, such as the tile 1330 in the center as shown in FIG. 13, may include a tile header 1332, and may omit a tile body, as shown. The tile header 1332 for the copy mode tile 1330 may include a tile-copy mode indicator 1334, which may have a value indicating that the tile is a copy mode tile, such as the value of one, and which may be included as the first bit of the tile header, as shown. The tile header 1332 for the copy mode tile 1330 may omit a tile content data size and may include a reference tile offset 1335, which may include a reference tile row offset 1336, a reference tile column offset 1338, or both as shown.

Figure 14:
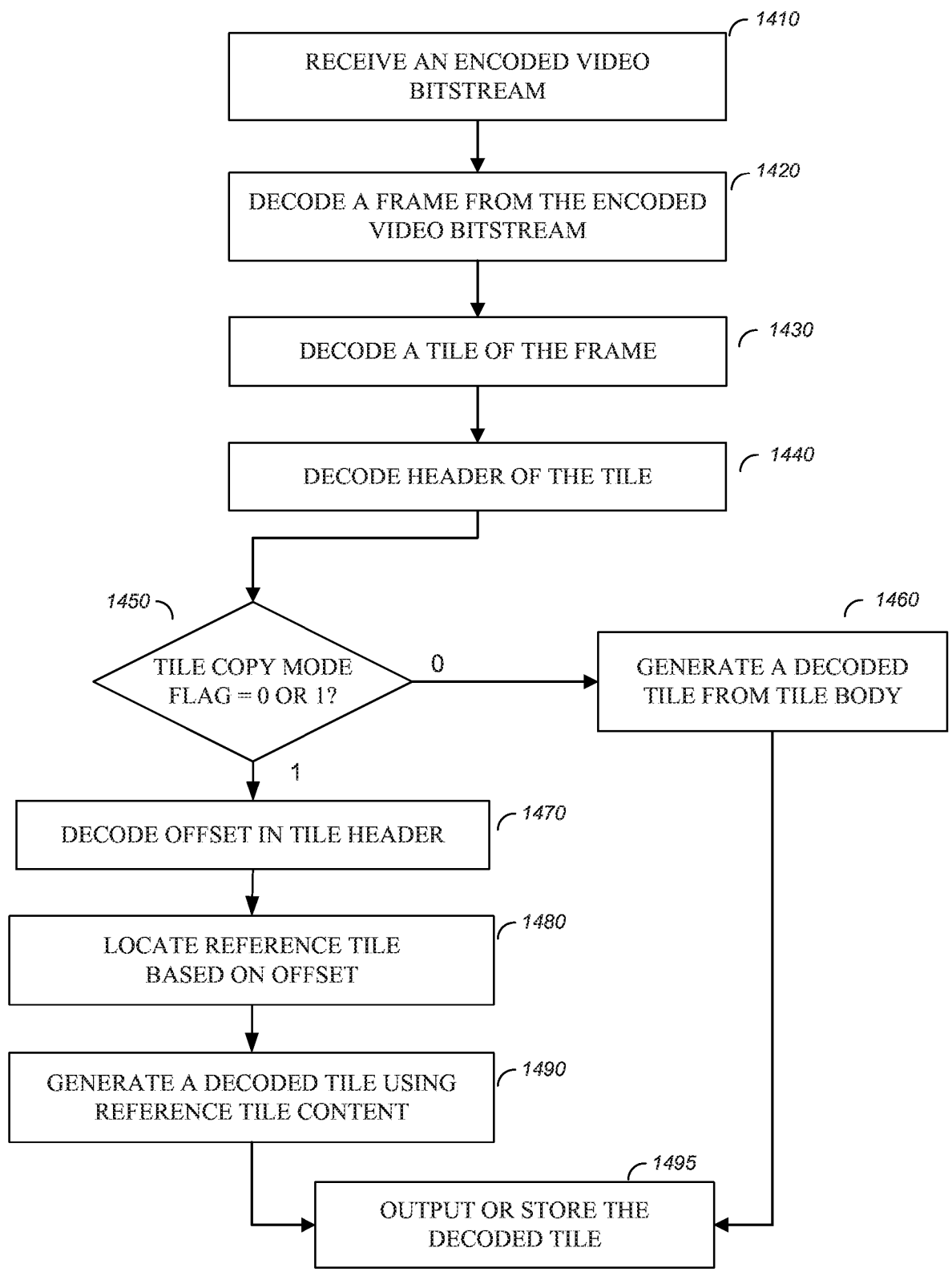
FIG. 14 is a block diagram of decoding using tile copying in accordance with implementations of this disclosure.

FIG. 14 is a block diagram of decoding using tile copying in accordance with implementations of this disclosure. In some implementations, decoding using tiling copying may be implemented in a decoder, such as the decoder 500 shown in FIG. 5. In some implementations, decoding using tiling copying may include receiving an encoded video bitstream at 1410, decoding a frame from the encoded video bitstream at 1420, decoding a tile of the frame at 1430, decoding a header of the tile at 1440, determining whether a tile copy mode flag is set to a value of zero or one at 1450, generating a decoded tile from the tile body at 1460, decoding an offset in the tile header at 1470, locating a reference tile based on the offset at 1480, generating a decoded tile using the reference tile content at 1490, outputting or storing the decoded tile at 1495, or any combination thereof.

In some implementations, an encoded video bitstream may be received at 1410. For example, an encoded video bitstream, such as bitstream 1300 shown in FIG. 13, may be received from another device, such as the encoder 400 shown in FIG. 4, via a wired or wireless communication system, such as the wireless network shown in FIG. 2. In some implementations, the encoded video bitstream received at the decoder may be decompressed by entropy coding. The received encoded video bitstream may have been encoded using tile copying as shown in FIG. 12.

In some implementations, a current frame from the encoded video bitstream may be decoded at 1420. For example, the encoded video bitstream may contain video data from a sequence of frames, including video data of a single frame such as frame 1310 as shown in FIG. 13. Decoding may occur on a frame-by-frame basis.

In some implementations, a current, or first, tile of the current frame may be decoded at 1430. For example, the current frame may be partitioned into multiple tiles, such as tiles 1320/1330/1340 as shown in FIG. 13, of which the current tile is decoded.

In some implementations, a header for the current tile may be decoded at 1440. For example, the current tile may contain information representing a tile header such as the tile header 1322/1332/1342 shown in FIG. 13. Decoding the bits of the current tile header may provide information indicating a size of the corresponding tile body. In some implementations, the decoded tile header bits may also include a tile-copy mode indicator, such as a bit, or flag. For example, the current tile header may include the tile-copy mode indicator 1324/1334 as shown in FIG. 13.

In some implementations, it may be determined whether or not the current tile is a copy tile at 1450. For example, it may be determined that the current tile is not a copy tile if the decoded tile-copy mode indicator has a value of zero, in which case, decoding the tile content can proceed in a conventional manner by decoding the body of the tile corresponding to the current tile at 1460. As another example, it may be determined that the current tile is a copy tile if the decoded tile-copy mode indicator has a value of one.

In some implementations, a reference tile offset may be decoded from the current tile header at 1470. For example, on a condition that the decoded tile-copy mode indicator has a value of one, the current tile header may also include offset information identifying a spatial difference between a location, in the current frame, of the tile encoded as the current tile, and a location, in the current frame, of the tile encoded as a reference tile. In some implementations, the reference tile offset may be expressed as a row offset and a column offset, such as the absolute row and column distance between the current tile and the reference tile. For example, the current decoded tile generated at 1430 may correspond with the third column and fourth row of the current frame, the reference tile may correspond with the second column and third row of the current frame, and the decoded reference tile offset may be expressed as (1,1). In some implementations, the decoder may identify the current tile as a copy tile by extracting the decoded offset information in the tile header alone, and without reliance on decoding a tile-copy mode indicator.

In some implementations, decoding the reference tile offset at 1470 may include reading the header of the current tile from the decoded bitstream without using entropy coding. For example, the tile header may be encoded without the compression of entropy encoding and therefore, decoding the header from the received encoded bitstream does not require entropy coding.

In some implementations, decoding the reference tile offset at 1470 may include decoding the header of the current tile using entropy coding. For example, the tile header may be encoded using entropy encoding and therefore, decoding the header from the received encoded bitstream may include entropy decoding.

In some implementations, the tile content corresponding to the current tile may be found by locating the reference tile at 1480 based on the decoded reference tile offset information. For example, the decoded reference tile offset may indicate that the reference tile location within the current frame is one row above and one column to the left with respect to the location of the current tile within the current frame. The tile content corresponding to the current tile may then be found by reading the decoded reference tile at the determined location.

In some implementations, a decoded current tile may be generated using the tile content found at the corresponding reference tile at 1490. For example, since the current tile is a copy tile and the tile content for the current tile was omitted from the encoded bitstream during the encoding, the tile content of reference tile located at 1480 may be decoded to generate the decoded current tile.

In some implementations, the decoded current tile may be output to another device or stored in memory for future output to another device at 1495. For example, the decoded tile generated at 1460/1490 may be output for further decoding at a block level and pixel level to reproduce the video frame.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, not all elements of the methods described herein may be required to implement a method in accordance with the disclosed subject matter.

The implementations of the transmitting station 100A and/or the receiving station 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 100A and the receiving station 100B do not necessarily have to be implemented in the same manner.

Further, in one implementation, for example, the transmitting station 100A or the receiving station 100B can be implemented using a computer program that, when executed, carries out any of the respective methods, algorithms and/or instructions described herein. In addition or alternatively, for example, a special purpose computer/processor can be utilized that contains specialized hardware for carrying out any of the methods, algorithms, or instructions described herein.

The transmitting station 100A and receiving station 100B can, for example, be implemented on computers in a real-time video system. Alternatively, the transmitting station 100A can be implemented on a server and the receiving station 100B can be implemented on a device separate from the server, such as a hand-held communications device. In this instance, the transmitting station 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 100A. Other suitable transmitting station 100A and receiving station 100B implementation schemes are available. For example, the receiving station 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method comprising:

receiving an encoded bitstream including information representing a current frame of video data;

decoding, by a processor in response to instructions stored on a non-transitory computer readable medium, the current frame, wherein decoding the current frame includes:

decoding a current tile from the current frame, wherein the current tile comprises two or more blocks, and wherein decoding the current tile includes:

decoding, from the encoded bitstream, a header for the current tile, wherein decoding the header includes decoding a tile copy mode indicator, and wherein:

on a condition that the tile copy mode indicator indicates a tile-copy mode of copy, wherein the tile-copy mode of copy indicates that the encoded bitstream does not include entropy coded content data for the current tile:

decoding the header for the current tile includes decoding offset information from the header, wherein the offset information indicates a spatial difference between a location of the current tile in the current frame and a location of a reference tile in the current frame, and wherein the offset information includes at least one of a reference tile row offset or a reference tile column offset;

locating reference tile content information representing the reference tile in the encoded bitstream based on the offset information, the reference tile content information comprising at least one of motion information and residuals of blocks of the reference tile; and omitting decoding current tile content information from the encoded bitstream;

generating a decoded tile corresponding to the current tile by using the reference tile content information;

including the decoded tile in a decoded output video stream; and outputting or storing the decoded current frame.

2. The method of claim 1, wherein the location of the reference tile in the current frame is spatially adjacent to the location of the current tile in the current frame, and wherein a tile scan order position of the reference tile precedes a tile scan order position of the current tile.

3. The method of claim 1, wherein a location of a neighbor tile in the current frame is spatially adjacent to the location of the current tile in the current frame, wherein a tile copy mode indicator for the neighbor tile indicates a tile-copy mode of copy, a tile scan order position of the neighbor tile precedes a tile scan order position of the current tile, and offset information for the neighbor tile indicates the reference tile.

4. A method comprising:

decoding, by a processor in response to instructions stored on a non-transitory computer readable medium, a current frame from an encoded video bitstream, wherein decoding the current frame includes:

decoding, from the encoded video bitstream, tile information for a current tile of the current frame, wherein the current tile comprises two or more blocks; and wherein decoding the tile information for the current tile of the current frame includes:

decoding a reference tile offset, wherein the tile information for the current tile omits encoded tile content information corresponding to the current tile and wherein the reference tile offset indicates at least one of a row spatial difference or a column spatial difference between a location of the current tile in the current frame and a location of a reference tile in the current frame, and wherein decoding the tile information for the current tile includes decoding a tile header for the current tile, wherein the tile header includes the reference tile offset;

identifying, from the encoded video bitstream, encoded tile content information corresponding to the reference tile based on the reference tile offset, wherein the tile content information corresponding to the reference tile comprising at least one of motion information or residuals of blocks of the reference tile;

generating a decoded tile corresponding to the current tile by decoding the encoded tile content information corresponding to the reference tile as the current tile; and including the decoded tile in a decoded output video stream; and outputting or storing the decoded current frame.

5. The method of claim 4, wherein the location of the reference tile in the current frame is spatially adjacent to the location of the current tile in the current frame, and wherein a tile scan order position of the reference tile precedes a tile scan order position of the current tile.

6. The method of claim 4, wherein a location of a neighbor tile in the current frame is spatially adjacent to the location of the current tile in the current frame, and wherein a tile copy mode indicator for the neighbor tile indicates a tile-copy mode of copy, a tile scan order position of the neighbor tile precedes a tile scan order position of the current tile, and reference tile offset information for the neighbor tile indicates the reference tile.

7. The method of claim 4, wherein decoding the tile information for the current tile includes decoding a tile copy mode indicator indicating a tile-copy mode for the current tile of copy.

8. The method of claim 4, wherein decoding the tile information for the current tile includes:

decoding a tile copy mode indicator indicating a tile-copy mode for the current tile; and decoding the reference tile offset is performed in response to determining that the tile copy mode indicator indicates a tile-copy mode of copy.

9. The method of claim 4, wherein decoding the current frame includes:

decoding, from the encoded video bitstream, tile information for a second tile of the current frame, wherein the tile information for the second tile includes encoded tile content information corresponding to a second frame, wherein the tile information for the second frame is located prior to the tile information for the current frame in the encoded video bitstream, and wherein the second tile is the reference tile.

10. A method, comprising:

encoding, by a processor in response to instructions stored on a non-transitory computer readable medium, a frame from an input video stream by:

identifying tiles from the frame;

generating a first encoded tile by encoding a first tile from the tiles, wherein the first tile comprises two or more first blocks;

including the first encoded tile in an output bitstream;

generating a second encoded tile by encoding a second tile from the tiles, wherein the second tile comprises two or more second blocks;

determining whether a difference between encoded tile content of the first encoded tile and encoded tile content of the second encoded tile is within a threshold;

on a condition that the difference is within the threshold:

identifying an offset indicating a difference between a spatial location of the first tile in the frame and the second tile in the frame, including the offset in the output bitstream, and omitting the encoded tile content of the second encoded tile from the output bitstream; and transmitting or storing the output bitstream.

11. The method of claim 10, wherein including the offset comprises:

defining a header for the second encoded tile; and including the offset within the header.

12. The method of claim 10, wherein encoding the first tile and encoding the second tile comprises encoding motion information and residuals of each of the first tile and the second tile, and wherein omitting the encoded tile content comprises omitting the encoded motion information and the residuals of the second tile from the output bitstream.

13. The method of claim 10, wherein including the offset in the output bitstream comprises encoding without using entropy coding.

14. The method of claim 10, wherein including the offset in the output bitstream comprises:

including spatial offset information related to the first tile within a header of the second tile written to the output bitstream.

15. The method of claim 10, further comprising:

identifying previously coded tiles spatially proximate to a current tile as candidate tiles; and selecting the first encoded tile from the candidate tiles.

16. The method of claim 15, wherein the candidate tiles include at least one of a first candidate tile that is located above the current tile, a second candidate tile that is located left of the current tile, a third candidate tile that is located above-left of the current tile, or a fourth candidate tile that is located above-right of the current tile.

17. The method of claim 15, wherein the candidate tiles are located immediately adjacent to the current tile.

18. The method of claim 10, further comprising:

generating a tile-copy mode indicator that indicates whether the second encoded tile in the output bitstream is a copy tile, wherein on a condition that the second encoded tile is the copy tile, the encoded tile content for the second encoded tile is omitted from the output bitstream and a tile header for the second encoded tile includes the tile-copy mode indicator and the offset for locating a reference tile having the encoded tile content for the second encoded tile.

19. The method of claim 1, further comprising:

on a condition that the tile copy mode indicator indicates a tile-copy mode other than copy:

generating a decoded tile corresponding to the current tile by decoding tile content information from the encoded bitstream subsequent to the header for the current tile.

\* \* \* \* \*